United States Patent
Grieve (10) Patent No.: US 8,544,067 B2
(45) Date of Patent: Sep. 24, 2013

(54) SYSTEM AND METHOD FOR AUTHENTICATING WEB USERS

(75) Inventor: Andrew A. Grieve, Waterloo (CA)

(73) Assignee: Google Inc., Mountain View, CA (US)

(\*) Notice: Subject to any disclaimer, the term of this patent is extended or adjusted under 35 U.S.C. 154(b) by 433 days.

(21) Appl. No.: 12/824,024

(22) Filed: Jun. 25, 2010

(65) Prior Publication Data

US 2011/0321133 A1    Dec. 29, 2011

(51) Int. Cl.
    *H04L 29/06*    (2006.01)
(52) U.S. Cl.
    USPC .............................. 726/4; 713/168; 713/182
(58) Field of Classification Search
    None
    See application file for complete search history.

(56) References Cited

U.S. PATENT DOCUMENTS

| 8,276,190 B1* | 9/2012 | Chang et al. ................... 726/3 |
| 2005/0228782 A1* | 10/2005 | Bronstein et al. ............... 707/3 |
| 2008/0282338 A1* | 11/2008 | Beer ............................. 726/12 |
| 2009/0037517 A1* | 2/2009 | Frei .............................. 709/202 |
| 2009/0328063 A1* | 12/2009 | Corvera et al. ............... 719/315 |
| 2011/0061095 A1* | 3/2011 | Wiseman et al. ................ 726/4 |

\* cited by examiner

*Primary Examiner* — Hadi Armouche

(74) *Attorney, Agent, or Firm* — McDermott Will & Emery LLP

(57) ABSTRACT

Disclosed are systems and methods for authenticating web users. In one embodiment, a method includes sending the destination web page to the parent frame of the web browser, where the destination web page when processed by the web browser is operable to perform operations, including determining if the web user is authenticated with the content provider and generating a child frame associated with the parent frame if the web user is not authenticated with the content provider. The destination web page is operable to perform further operations, including requesting, by the child frame, an authentication web page from an authorization provider, receiving, by the child frame, the authentication data from the authorization provider, and receiving, by the parent frame, the authentication data.

45 Claims, 4 Drawing Sheets

SYSTEM AND METHOD FOR AUTHENTICATING WEB USERS

TECHNICAL FIELD

The principles disclosed herein relate generally to authenticating web users, and more particularly to authenticating web users using a child frame to obtain authentication data from an authorization provider.

BACKGROUND

Many web services may need to work together to provide the user with a desired task. However, many of these web services require the web user to grant the web service access to the web user's protected resources associated with another web site. For example, one web site, such as a social network site, may request the username and password associated with the web user's email account to find more friends. However, to use the service provided by the social network site for finding more social networking friends, web users have to manually enter their private authentication credentials associated with their email service to share with the social network site. As web users access more web sites associated with the user's protected resources, web users must provide and share their username and password to many different entities. Web users are in need of a better user experience with enhanced privacy and security so that their authentication credentials are not stolen or abused.

In the last few years, authentication protocols, such as Oauth, have provided methods for a web site to authenticate a web user using an external authorization provider trusted by the web user. Typically, these authentication protocols require the web site that needs to authenticate the web server to redirect the user's web browser to the authorization provider's authentication web page to receive an authentication token, which may include an encrypted string of the web user's authentication credentials. If the web user is already authenticated or logged in with the authorization provider and the web site has already been given permission to authenticate with the authorization provider, the authentication web page will immediately redirect to the web site initially requested by the user with an authentication token. This sequence of redirects occurs while the user is waiting for the web site to load. Thus, this sequence of redirects causes an increase in the amount of time for the web site to load in the browser. Further, the browser will display the web site of the content provider, then the authentication web page of the authorization provider, and then the web site of the content provider again. As a result, the web user may have a poor user experience because of the increased time in loading the web site and the confusion caused by the web site redirections. If a web site uses Application Cache from HTML5 or another similar method, the web site may take even longer to load because the browser must load the web site initially before the browser is redirected to the authentication page at the authorization provider, which then redirects the browser to the initial web site requested by the user. The need has arisen to provide a better user experience for authenticating web users while adequately protecting the authentication credentials of the users.

SUMMARY

Disclosed are systems and methods for authenticating web users. In one embodiment, a method includes receiving a request, at a content provider, for a destination web page from a parent frame of a web browser associated with the web user and sending the destination web page to the parent frame of the web browser. The destination web page when processed by the web browser is operable to perform operations that include determining if the web user is authenticated with the content provider and generating a child frame associated with the parent frame if the web user is not authenticated with the content provider. The destination web page when processed by the web browser is also operable to perform operations that include requesting, by the child frame, an authentication web page from an authorization provider, and receiving, by the child frame, the authentication data from the authorization provider. The destination web page when processed by the web browser is also operable to perform operations that include receiving, by the parent frame, the authentication data from the child frame. The method further includes receiving the authentication data.

In one embodiment, a system for authenticating a web user includes a content provider, which includes one or more computing devices. The content provider is operable to receive a request for a destination web page from a parent frame of a web browser associated with the web user, and send the destination web page to the parent frame of the web browser. The destination web page when processed by the web browser is operable to perform operations that include determining if the web user is authenticated with the content provider and generating a child frame associated with the parent frame if the web user is not authenticated with the content provider. The destination web page when processed by the web browser is also operable to perform operations that include requesting, by the child frame, an authentication web page from an authorization provider, and receiving, by the child frame, the authentication data from the authorization provider. The destination web page when processed by the web browser is also operable to perform operations that include receiving, by the parent frame, the authentication data. The content provider is further operable to receive the authentication data.

The present disclosure provides several important technical advantages. In certain embodiments, the present disclosure may authenticate a web user to access a web site using authentication data provided by an authorization provider, but in a much quicker time than typical authentication methods. Using a child frame of a browser to retrieve the authentication data by using redirects and loading the authentication web page allows the parent frame of the browser to concurrently load the requested web page. By eliminating the need for redirecting the parent frame of the browser to load the authentication web page, the web user enjoys a more user friendly experience since the web user is not subject to seeing the parent frame load multiple web pages to authenticate the user. Thus, the requested web page can authenticate the web user by using authentication data provided by an authentication web site in a manner that is transparent to the user.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
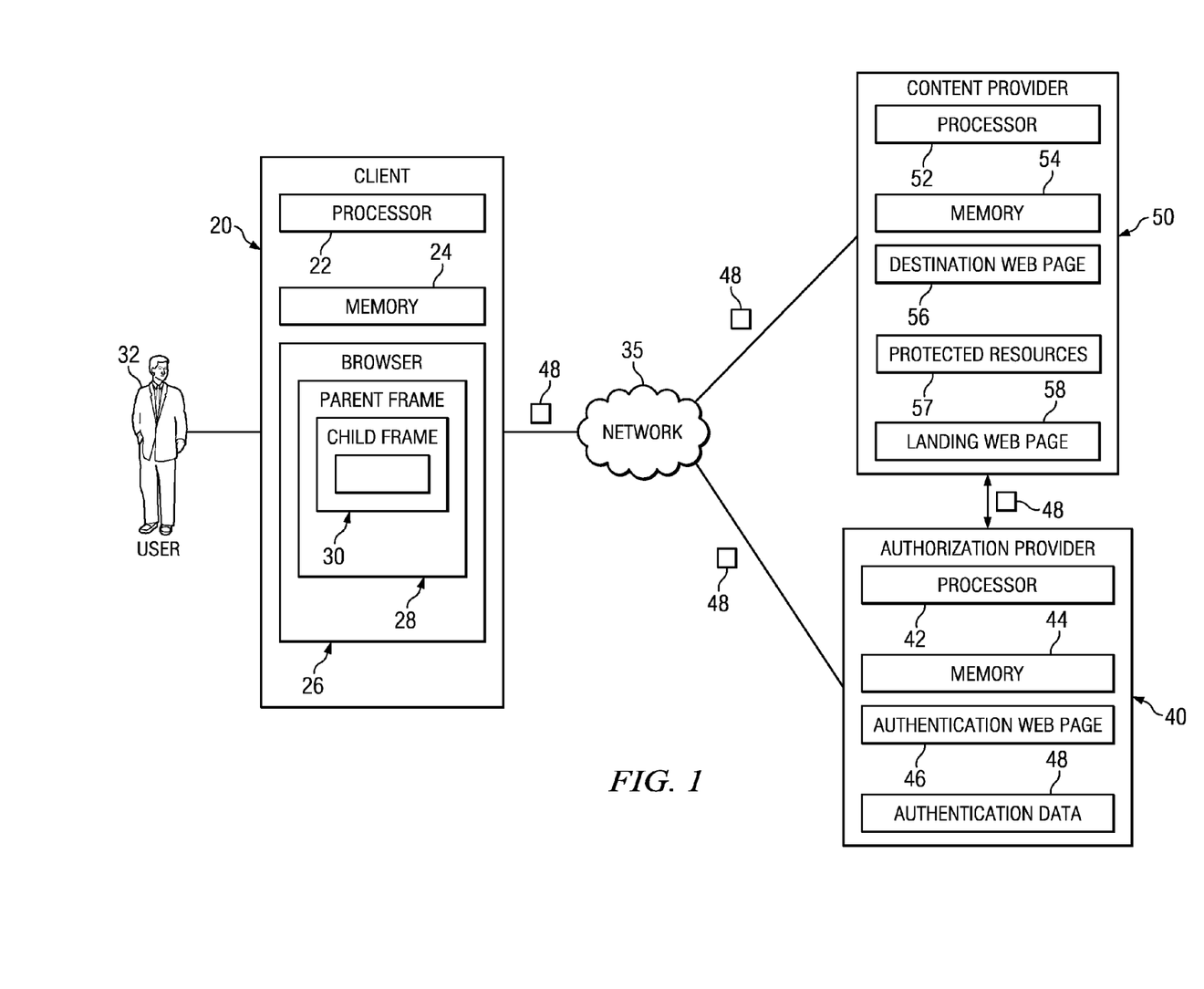
FIG. 1 illustrates an example system for authenticating web users.

FIG. 1 illustrates an example system 100 for authenticating web users. According to the illustrated embodiment, system 100 includes a web user 32, a client 20, a network 35, an authorization provider 40, and a content provider 50. Generally, system 100 may authenticate web user 32 at content provider 50 by using authentication data 48 generated by authorization provider 40. For purposes of explanation, examples describing system 100 may generally be associated with authenticating requests for accessing a web page. However, system 100 may be associated with authenticating requests for any information resource (e.g., web page, image, video, or other type of content) that is identified by a Uniform Resource Identifier ("URI").

Client 20 may represent a general or special-purpose computer capable of performing the described operations. For example, client 20 may include, but are not limited to, mobile devices; cell phones; laptop computers; desktop computers; end user devices; video monitors; cameras; personal digital assistants (PDAs); or any other communication hardware, software, and/or encoded logic that supports the communication of web pages, images, videos, text or other suitable forms of data. Additionally, in particular embodiments, client 20 may include one or more browsers 26 and/or one or more processors 20 operable to execute computer logic and/or software encoded on tangible media that perform the described functionality. Client 20 may include one or more input devices such as a keyboard, trackball, mouse, and/or one or more Graphical User Interfaces (GUIs) through which user 32 may interact with the applications running on client 20. Client 20 may include any appropriate combination of hardware, software, and/or encoded logic suitable to perform the described functionality. Client 20 may include memory 24. Client 30 may be communicatively coupled with authorization provider 40, and/or content provider 50, directly or indirectly, over network 35. System 10 may comprise any appropriate number and type of clients 20.

Client 30 may include any hardware and/or controlling logic used to communicate information to and from one or more elements illustrated in FIG. 1. For example, client 30 may be operable to receive and process data of different types that may be transmitted via different protocols or formats. Other elements in FIG. 1 may also comprise hardware and/or controlling logic to communicate information to and from one or more elements illustrated in FIG. 1. For example, elements in FIG. 1 may communicate with Hypertext Transfer Protocol (HTTP), which is a request-response protocol standard. In some embodiments, an HTTP header may include cookies, which may be used for authentication, session tracking, or any other suitable purpose. A cookie may be a text string containing bits of information, which may be encrypted for privacy and security purposes. In some embodiments, communications between the elements of FIG. 1 may be encrypted for privacy and security purposes.

Processor 22 may represent and/or include any form of processing component, including general purpose computers, dedicated microprocessors, or other processing devices capable of processing electronic information. Examples of processor 22 include digital signal processors (DSPs), application-specific integrated circuits (ASICs), field-programmable gate arrays (FPGAs), and any other suitable specific or general purpose processors. Although FIG. 1 illustrates a single processor 22 in client 30, client 30 may include any suitable number of processors 22.

Memory 24 may store processor instructions, browser 26, information resources, and/or any other suitable information. Memory 24 may comprise any collection and arrangement of volatile and/or non-volatile components suitable for storing data. For example, memory 24 may comprise random access memory (RAM) devices, read only memory (ROM) devices, magnetic storage devices, optical storage devices, and/or any other suitable data storage devices. In particular embodiments, memory 24 may represent, in part, computer-readable storage media on which computer instructions and/or logic are encoded. In such embodiments, some or all the described functionality of the computer instructions and/or logic included in destination web page 56, which is described below, may be provided by processor 22 executing the instructions encoded on the described media. Although shown in FIG. 1 as a single component, memory 40 may represent any number of memory components within, local to, and/or accessible by processor 22 and browser 26.

Browser 26 may be a software application that is operable to request, process, and display one or more information resources (e.g., web page, image, video, or other type of content). For example, user 32 may enter a particular URI (e.g., http://example.destinationwebpage.com) associated with a web page in the address bar of a navigation browser 26, which may cause browser 26 to request, process, and display the web page. Further, browser 26 may allow user 32 to interact with a web page that has been loaded in browser 26. For example, user 32 may enter authentication credentials (e.g., username, password, email address, etc.) in a web page that has been loaded in browser 26 to authenticate user 32 to the web site associated with the web page. Although browser 26 is typically intended to access the World Wide Web, browser 26 may also be used to access information located in private networks or in file systems.

In some embodiments, a parent frame 28 can be the main window in browser 26 that is operable to request, process, and display one or more information sources associated with a URI. In some embodiments, a child frame 30 can be a second window in browser 26 that is also operable to request, process, and display one or more information sources associated with a URI. For example, parent frame 28 is operable to request, process, and display a first web page associated with a first URI and child frame 30 is operable to request, process, and display a second web page associated with a second URI. Thus, parent frame 28 and child frame 30 are operable to request, process, and display two different web pages concurrently. For example, parent frame 28 may communicate with content provider 50 while child frame 30 communicates with authorization provider 40. Parent frame 28 and child frame 30 are operable to communicate data between frames. Child frame 30 may be generated by code and/or logic that is included in the web page associated with parent frame 28. For example, child frame 30 may be generated as an iframe using JavaScript. Embodiments of parent frame 28 and child frame 30 are illustrated in more detail below in FIGS. 2A, 2B, 2C, and 2D.

User 32 may interact with client 20 and/or browser 26. User 32 may be anyone or anything attempting to access an information resource in system 100.

Network 35 may represent any form of communication network supporting circuit-switched, packet-based, and/or any other suitable type of communications. Network 35 may additionally include any other components of system 100 capable of transmitting and/or receiving information over a communication network, including client 20, authorization provider 40, and/or content provider 50. Although shown in FIG. 1 as a single element, network 35 may represent one or more separate networks (including all or parts of various different networks) that are separated and serve different respective elements illustrated in FIG. 1. Network 35 may include routers, hubs, switches, firewalls, content switches, gateways, call controllers, and/or any other suitable components in any suitable form or arrangement. Network 35 may include, in whole or in part, one or more secured and/or encrypted Virtual Private Networks (VPNs) operable to couple one or more network elements together by operating or communicating over elements of a public or external communication network. In general, network 35 may comprise any combination of public or private communication equipment such as elements of the public switched telephone network (PSTN), a global computer network such as the Internet, a local area network (LAN), a wide area network (WAN), or other appropriate communication equipment.

Authorization provider 40 may communicate with browser 26 to authenticate user 32. Authorization provider 40 may store a cookie associated with user 32. Authorization provider 40 may be any suitable computing device comprising a processor 42 and a memory 44. For example, authorization provider 40 may comprise one or more machines, workstations, laptops, blade servers, server farms, and/or stand alone servers. Authorization provider 40 is typically trusted by users 32, which encourages users 32 to share sensitive user credentials with authorization provider 40 rather than share these sensitive user credentials with an untrusted source, such as content provider 50. Authorization provider 40 may be operable to receive a request (e.g., an HTTP GET request) for authentication web page 46 and transmit authentication web page 46 to requestor. Authorization provider 40 may be operable to receive authentication credentials from user 32 (e.g., in an HTTP POST method) and generate authentication data 48 using the authentication credentials received from user 32. Authorization provider 40 may be operable to communicate authentication data 48 to browser 26 in any suitable manner. For example, authorization provider 40 may communicate authentication data 48 to browser 26 in a cookie sent as part of an HTTP header. Authorization provider 40 may be operable to receive a request from content provider 50 to verify the authenticity of authentication data 48 and transmit a response to content provider 50 that verifies the authenticity of authentication data 48. System 100 may use authentication protocols, such as Oauth or any other suitable authentication protocol, to provide authentication data 48 generated by authorization provider 40 to content provider 50 for authenticating user 32.

Authentication web page 46 may be a document or information that can be processed to structure and display content by browser 26. Authentication web page 46 may include logic and/or software. For example, authentication web page 46 may include HyperText Markup Language ("HTTP"), Extensible HyperText Markup Language ("XHTML"), Cascading Style Sheets ("CSS"), JavaScript, or any other logic and/or software for performing the described operations. If user 32 is not currently authenticated with authorization provider 40, authentication web page may include a form that is operable to receive authentication credentials from user 32.

Authentication data 48 may be any type of data associated with authenticating user 32. For example, authentication data 48 may include, but is not limited to, the username, password, and/or email address of user 32. Authentication data 48 may include data entered by user 32 in authentication web page 46 that is displayed in browser 26. Authentication data 48 may be generated by authorization provider 40 and used to authenticate user 32 to content provider 50 in a manner where user 32 may access protected data without sharing sensitive authentication credentials with content provider 50. Authentication data 48 may be stored in an authentication token, where the authentication token may include an encrypted string including the authentication data 46. In some embodiments, authentication data 48 or authentication token may be stored in a cookie.

Content provider 50 may store destination web page 56 and/or protected resources 57 that are requested by user 32 via browser 26. Content provider 50 may store a cookie associated with user 32. Content provider 50 may be any suitable computing device comprising a processor 52 and a memory 54. For example, content provider 50 may comprise one or more machines, workstations, laptops, blade servers, server farms, and/or stand alone servers. Content provider 50 may store protected resources 57 that require content provider 50 to authenticate user 32 before transmitted protected resources 57. System 100 may use authentication protocols, such as Oauth or any other suitable authentication protocol, to provide authentication data 48 generated by authorization provider 40 to content provider 50 for authenticating user 32. Content provider 50 may be operable to receive a request (e.g., an HTTP GET request) for destination web page 56 and transmit destination web page 56 to requestor, if user 32 is authenticated.

Destination web page 56 may be a document or information that can be processed to structure and display content by browser 26. Destination web page 56 may include logic and/or software. For example, destination web page 56 may include HTTP, XHTML, CSS, JavaScript, or any other logic and/or software for performing the described operations. For example, destination web page 56 may determine if user 32 is currently authenticated with content provider 50 to access one or more protected resources 57 associated with destination web page 56. If user 32 is not authenticated with content provider 50, destination web page 56 may instruct browser 32 to generate child frame 30 to perform the steps of authenticating user 32 with authorization provider 40 while parent frame 28 of browser 26 continues to load destination web page 56. The logic and/or software included in destination web page 56 for performing the described operations is explained in more detail below and in TABLE 1.

Protected resources 47 may be any information resource (e.g., web page, image, video, or other type of content) identified by an URI that requires user 32 to be authenticated to access protected resources 47.

Landing web page 58 may be a document or information that can be processed to structure and display content by browser 26. Landing web page 58 may include logic and/or software. For example, landing web page 56 may include HTTP, XHTML, CSS, JavaScript, or any other logic and/or software for performing the described operations. The URI associated with landing web page 58 may be associated with the same domain name (e.g., domain name of content provider 50) as destination web page 56. As explained below in more detail, child frame 30 may load landing web page 58 from content provider 50 in order to redirect authentication data 48 from authorization provider 40 to content provider 50. In some embodiments, landing web page 56 may display a blank page to minimize the height of child frame that loads landing web page 56 and to reduce the amount of resources used to load landing web page 56.

Each of client 20, authorization provider 40, and content provider 50 may represent any appropriate combination of hardware and/or software suitable to perform the described functions. Some embodiments of the disclosure may include logic and/or software contained within a medium. The medium may include RAM, ROM, or disk drives. The medium may be non-transitory. In some embodiments, the logic and/or software may be contained within hardware configuration. The logic and/or software may also be embedded within any other suitable medium without departing from the scope of the disclosure. For example, destination web page 46 may be logic and/or software stored and encoded on tangible, computer-readable media and executed on processor 22 and/or other computer hardware suitable to instruct browser 26 to perform the described functions.

In operation, user 32 requests destination web page 56 from content provider 50. The requested destination web page 56 may be stored in memory 24 of client 20 and processed by parent frame 28 of browser 26. Thus, browser 26, parent frame 28, and/or child frame 30 may be able to perform the operations described in the logic and/or software located in destination web page 56.

Browser 26 may determine if user 32 is logged in at content provider 50. In some embodiments, browser 26 may determine if user 32 is authenticated with content provider 50 by analyzing the network redirect response received from content provider 50. If user 32 is authenticated with content provider 50, destination web page 56 and its associated protected resources 57 are displayed in parent frame 28 of browser 26.

If user 32 is not authenticated with content provider 50, browser 26 creates child frame 30 to perform the steps of authenticating user 32. Child frame 30 may be created with one or more attributes. For example, child frame 30 may be hidden to user 32. In some embodiments, child frame 30 may be hidden by setting its visibility attribute to hidden using CSS or any other suitable method. In some embodiments, child frame 30 may be hidden by placing child frame 30 off the visible section of browser 26. By hiding child frame 30 from user 32, user 32 may have a more user friendly experience since user 32 is not confused by the authentication process occurring within child frame 30. Further, content provider 50 may authenticate user 32 by using authentication data 48 provided by authorization provider 40 in a manner that is transparent to user 32.

Child frame 30 may have its source set to the URI associated with authentication web page 46. Thus child frame 30 may request authentication web page 46 from authorization provider 40 as soon as child frame 30 is created. In some embodiments, child frame 30 may have its height set to a small value (e.g., two pixels). By setting the height of child frame 30 to a small value, parent frame may be able to determine if child frame 30 loads a non-blank page, which may cause the height of child frame to increase.

To provide authentication data 48 from authorization provider to content provider 50, child frame 30 may request authentication web page where the request includes appropriate query parameters, including, but not limited to, the URI of landing web page 58. Thus, after authorization provider 40 receives an HTTP GET request for authentication web page 46, authorization provider 40 may respond to child frame 28 with a redirect request where the redirect request includes authentication data 48 and the URI of landing web page 58. When child frame 30 sends the HTTP GET request to load landing web page 58 from content provider 50, authentication data 48 is transmitted to content provider in the HTTP GET request. Authentication data 48 may be transmitted in any suitable format. For example, authentication data 48 may be transmitted as a cookie, authentication token, a JavaScript variable, HTML5 storage, etc. In some embodiments, authentication data 48 may be transmitted as part of each request in the header or as part of the request body. Any type of redirection may be used by child frame 30 to transmit authentication data 48 from authorization provider 40 to content provider 50.

By loading destination web page 46 in parent frame 28 while concurrently authenticating user 32 in child frame 30, browser 26 may authenticate user 32 and display destination web page 46 and its protected resources 47 in a much quicker time than typical authentication methods. In some embodiments, destination web page 46 may be completely loaded in parent frame 28 with the exception of loading protected resources 57, while child frame 30 is concurrently authenticating user 32. This advantage of the present disclosure is especially important in the context of mobile devices, which may take a long time to load each web page.

In some embodiments, destination web page 46 may utilize Application Cache from HTML 5 or any other similar function that requires destination web page 46 to finish loading before redirecting browser 26 to authentication web page 46. By using child frame 30 to authenticate user 32, browser 26 only has to load destination web page 46 once, which decreases the time it takes for browser 26 to display destination web page 46 and protected resources 57.

Child frame 30 may determine if user 32 is logged in at authorization provider 40. In some embodiments, child frame 30 may determine if user 32 is logged in by requesting authentication web page 46 with an HTTP GET request and determining if authentication data 48 is included in the response to the HTTP GET request. If user 32 is already logged in to authorization provider 40, then authentication data 48 is sent to child frame 30.

If user 32 is not logged in at authorization provider 40, browser 26 may make child frame 30 visible to user 32 and display authentication web page 46 in child frame 30. User may 32 enter log in information or authentication credentials in one or more forms provided by authentication web page 46. Authorization provider 40 generates authentication data 48 using the information provided by user 32. Authorization provider 40 may store authentication data 48 as an authentication token, cookie, JavaScript variable, HTML5 storage, or any other suitable data type.

In some embodiments, parent frame 28 may not be able to access any data included in child frame 30 if child frame 30 has loaded a web page from a domain that is different than the domain associated with the web page loaded in parent frame 28. Thus, parent frame 28 may use any suitable method for detecting when certain events occur that are associated with child frame 30. For example, parent frame 28 may not be able to determine if user 32 needs to log in to authorization provider 40. In some embodiments, parent frame 28 may determine if the height of child frame 30 exceeds a predetermined number of pixels. If child frame 30 exceeds a predetermined number of pixels, then parent frame 28 may determine that authentication web page 46 was loaded into browser 26 instead of landing web page 58, because landing web page 58 may be blank with a very low height. Thus, parent frame 28 may make child frame 30 visible so that user 32 can log in to authentication web page 46.

In some embodiments, parent frame 28 may check if the domain name of the web page loaded in child frame 30 is associated with the domain name of content provider 50 or associated with the domain name of authorization provider 40. If the web page that is loaded in child frame 30 is associated with the domain name of content provider 50, then landing web page 58 must have been loaded because the landing web page 58 shares the same domain name with content provider 50. If landing web page 58 is loaded, then user 32 has been authenticated with content provider 50. If the web page that is loaded in child frame 30 is associated with the domain name of authorization provider 40, then authentication web page 46 may still be loaded, which indicates that user 32 may need to log in to authentication web page 46.

Parent frame 28 may receive authentication data 48 obtained by child frame 30 in any suitable manner. For example, child frame 28 may transmit authentication data 48 to parent frame 28 via a cookie, direct dom access, HTML5 storage, HTML5 postMessage, or any other suitable method. In some embodiments, child frame 28 may store authentication data 48 in memory 24 and parent frame 28 may receive authentication data 48 from memory 24.

After parent frame 28 has determined that user 32 is authenticated with content provider 50, browser 26 may close child frame 30 because it is no longer needed. After child frame 30 has authenticated user 32 to content provider 50, parent frame 28 may send its original request to access protected resources 57 associated with destination web page 56 from content provider 50. Now that user 32 is authenticated by content provider 50, content provider 50 may transmit one or more protected resources 57 to parent frame 28. Parent frame 28 may display destination web page and its associated protected resources 57. In some embodiments, browser may use a timeout function to determine if this authentication process is not working properly.

Table 1 provides example logic and/or software included in destination web page 56. As illustrated in Table 1, the "/*text*/" notation identifies a section or element of the example logic and/or software included in destination web page 56. As illustrated in Table 1, the "//" notation further explains the functionality of the example logic and/or software included in destination web page 56.

TABLE 1

```
/*****************************************
*Timeout duration.
*****************************************/
var IFRAME_TIMEOUT_MS_ = 30 * 1000;
/*****************************************
*The iframe or child frame to load the authentication web page
*****************************************/
var activeLoginIframe_;
/*****************************************
*The timeout id.
*****************************************/
```

TABLE 1-continued

```
var loginTimeoutId_;
/*****************************************
*The original redirect URL.
*****************************************/
var redirectUrl_;
/*****************************************
*The callback to call once we are authenticated.
*****************************************/
var afterCallback;
/*****************************************
*Called when a network response from content provider is a redirect,
*which indicates that user is not authenticated.
*****************************************/
function handleRedirectResponse(redirectUrl, callback) {
    // Create/reuse the iframe.
    var iframe = initIframe_();
    iframe.src = redirectUrl;
    afterCallback = callback;
    loginTimeoutId_=window.setTimeout(onIframeTimeout_,
        IFRAME_TIMEOUT_MS_);
};
/*****************************************
*Timeout timer callback.
*****************************************/
//If the login times out, do a parent frame redirect to the login page. If a
//timeout happens, it means either:
//A)The user was online when they made the initial network request, but is
//no longer online (unlikely); or
//B) The iframe login code broke (more likely).
function onIframeTimeout_() {
    window.top.location = redirectUrl_;
};
/*****************************************
*Create the iframe if user is not authenticated with content provider
*****************************************/
function initIframe_() {
    var iframe = activeLoginIframe_;
    if (!iframe) {
        iframe = document.createElement('iframe'));
        //Browser may require the iframe to have a height of at
        least two pixels.
        iframe.style.height = '2px';
        iframe.style.visibility = 'hidden';
        iframe.onload = onIframeLoad_;
        activeLoginIframe_ = iframe;
        document.body.appendChild(iframe);
    }
    Return iframe;
};
/*****************************************
*Callback for when the iframe has loaded a page.
*****************************************/
function onIframeLoad () {
    //execution of a regular expression for finding authentication token
        stored in a cookie
    var authToken = /AUTH=([^;]+)/.exec(document.cookie) &&
        RegExp.lastParen;
    //if it finds the authentication token, then user is authenticated
    if (authToken) {
        window.clearTimeout(loginTimeoutId_);
        afterCallback ()
    } else {
        handleStillNotLoggedIn_();
    }
};
/*****************************************
*The iframe has loaded, but the user is still not logged in.
*****************************************/
function handleStillNotLoggedIn_() {
    //Check the height of the iframe to know if the login failed.
    window.setTimeout(function() {
        if (activeLoginIframe_.offsetHeight > 20) {
            activeLoginIframe_.style.visibility = '';
        }
    }, 0);
}
```

Figure 2A:
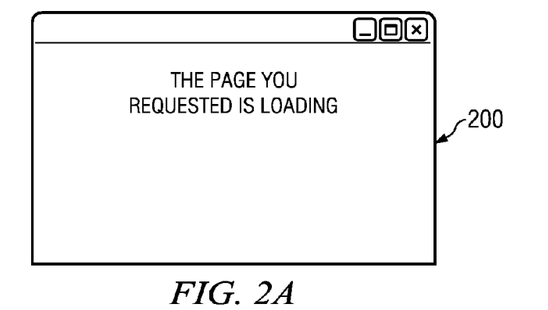
FIG. 2A illustrates an example parent frame in a web browser where the parent frame loads a web page that does not require authentication.

FIG. 2A illustrates an example parent frame 200 in a web browser where the parent frame loads a web page that does not require authentication.

Figure 2B:
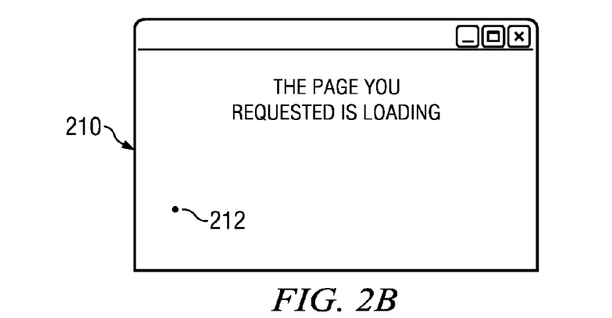
FIG. 2B illustrates an example parent frame and child frame in a web browser where the parent frame loads a web page where the user is already logged in to an authorization provider.

FIG. 2B illustrates an example parent frame 210 and child frame 212 in a web browser where the parent frame 210 loads a web page where user 32 is already logged in to authorization provider 40. Although child frame 212 is illustrated by a dot within parent frame 210, child frame 212 is hidden from display.

Figure 2C:
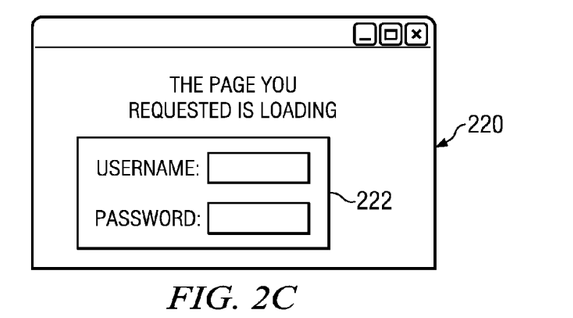
FIG. 2C illustrates an example parent frame and child frame in a web browser where the parent frame loads a web page where the user is not logged in to an authorization provider.

FIG. 2C illustrates an example parent frame 220 and child frame 222 in a web browser where parent frame 220 loads a web page where the user is not logged in to an authorization provider 40. Child frame 222 is now viewable to user 32 because authorization provider 40 requires authentication credentials of user 32 to generate authentication data 48.

Figure 2D:
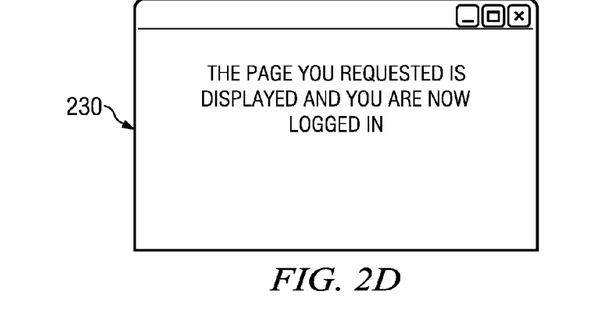
FIG. 2D illustrates an example parent frame in a web browser after the parent frame has loaded the destination web page and protected resources.

FIG. 2D illustrates an example parent frame 230 in a web browser after parent frame 230 has loaded destination web page 56 and its protected resources 57. If user 32 was already logged in at authorization provider 40 upon making the request to load destination web page 56, then user 32 can view the loading of destination web page 56 and its protected resources 57 in parent frame 230 while the child frame is authenticating user 32 in a manner hidden and transparent to user 32.

Figure 3:
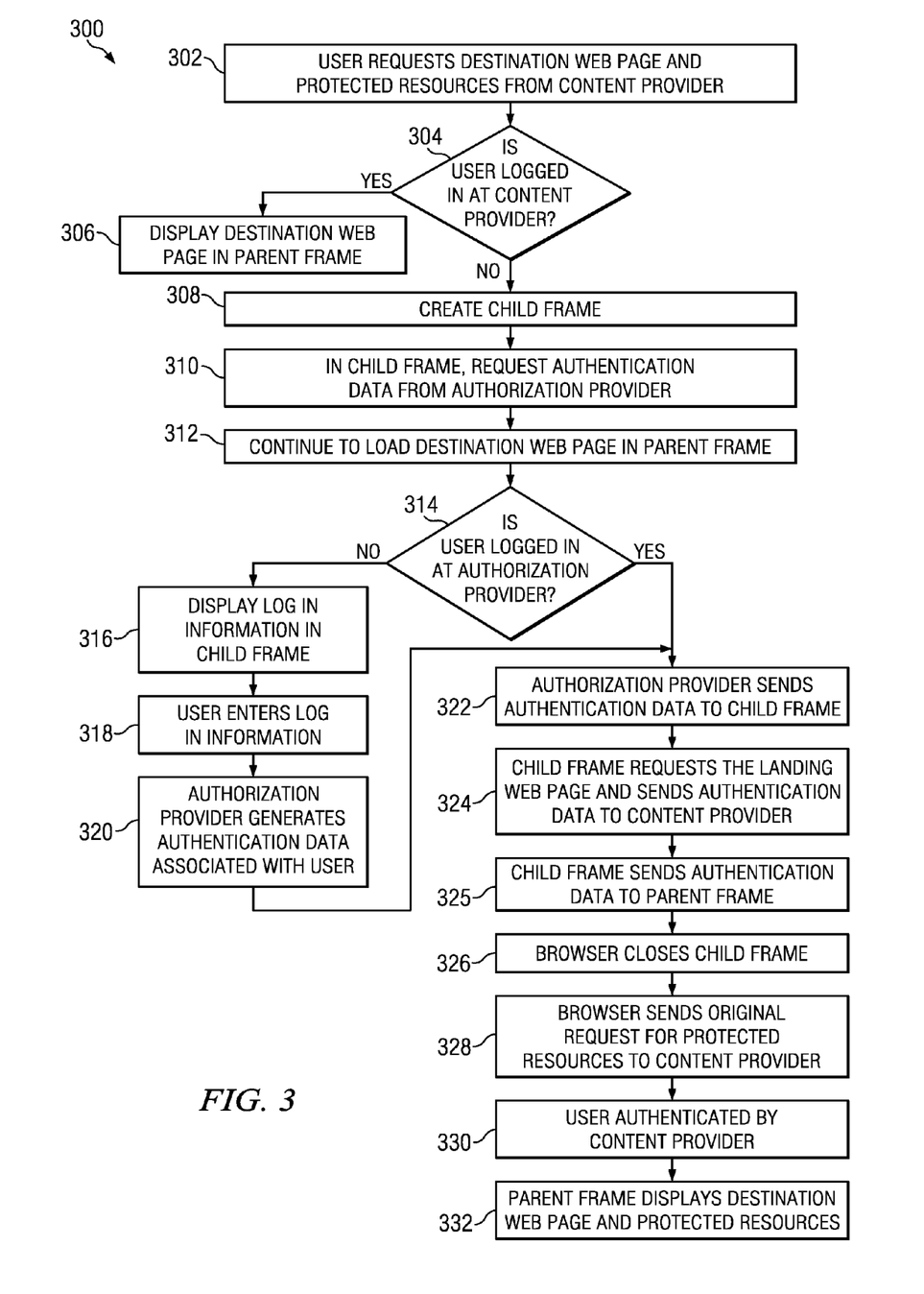
FIG. 3 illustrates a flow diagram of an embodiment for authenticating web users, according to certain embodiments.

FIG. 3 illustrates a flow diagram 300 of an embodiment for authenticating web users 32, according to certain embodiments. In the illustrated example, flow diagram 300 begins at step 302 when user 32 requests destination web page 56 and its associated protected resources 57 from content provider 50. The requested destination web page 56 may be stored in memory 24 of client 20 and processed by parent frame 28 of browser 26. Thus, browser 26, parent frame 28, and/or child frame 30 may be able to perform the operations described in the logic and/or software stored in destination web page 56.

At step 304, browser 26 may determine if user 32 is logged in at content provider 50. In some embodiments, browser 26 may analyze the network redirect response received from content provider 50 to determine if user 32 is authenticated with content provider 50. If user 32 is authenticated with content provider 50, the flow diagram continues to step 306 where destination web page 56 and its associated protected resources 57 are displayed in parent frame 28 of browser 26.

If user 32 is not authenticated with content provider 50, the flow diagram continues to step 308 where browser 26 creates child frame 30 to perform the steps of authenticating user 32. In some embodiments, child frame 30 may be hidden to user 32. By hiding child frame 30 from user 32, user 32 may have a more user friendly experience since user 32 is not confused by the authentication process occurring within child frame 30. Further, content provider 50 may authenticate user 32 by using authentication data 48 provided by authorization provider 40 in a manner that is transparent to user 32.

At step 310, child frame 30 may request authentication data 48 from authorization provider 40. In some embodiments, child frame 30 may request authentication data 48 from authorization provider 40 by requesting authentication web page 46 in an HTTP GET request. At step 312, parent frame 28 may continue to load destination web page 46. By loading destination web page 46 in parent frame 28 while concurrently authenticating user 32 in child frame 30, the present disclosure may authenticate user 32 and display destination web page 46 and its protected resources 47 in a much quicker time than typical authentication methods.

At step 314, child frame 30 determines if user 32 is logged in at authorization provider 40. In some embodiments, child frame 30 may determine if user 32 is logged in by requesting authentication web page 46 with an HTTP GET request and determining if authentication data 48 is included in the response to the HTTP GET request. If user 32 is already logged in to authorization provider 40, then authentication data 48 is sent to child frame 30 as illustrated by step 322.

If user 32 is not logged in at authorization provider 40, the flow diagram continues to step 316 where browser 26 may make child frame 30 visible to user 32 and display authentication web page 46 in child frame 30. At step 318, user 32 enters log in information or authentication credentials in one or more forms provided by authentication web page 46. At step 320, authorization provider 40 generates authentication data 48 using the information provided by user 32 and the flow diagram continues to step 322. In some embodiments, authorization provider 40 may store authentication data 48 in an authentication token or a cookie.

At step 322, authorization provider 40 sends authentication data 48 to child frame 30. In some embodiments, authorization provider 40 may send authentication data 48 in an authentication token or a cookie that is sent with the response to the HTTP GET request.

At step 324, child frame 30 requests landing web page 58 with an HTTP GET request and sends authentication data 48 to content provider 50 in the HTTP GET request. In some embodiments, authentication data 48 may be sent as an authentication token or as a cookie. At step 325, child frame 30 sends authentication data 48 to parent frame 28. In some embodiments, parent frame 28 may store authentication data 48 as an authentication token or as a cookie.

At step 326, browser 26 closes child frame 30 because child frame 30 has successfully provided authentication data 46 to content provider 40.

At step 328, parent frame 28 of browser 26 sends original request for protected resources 57 to content provider 50. Unprotected resources may already be loaded in parent frame 28. At step 330, user 32 is authenticated by content provider 50 and content provider 50 may transmit one or more protected resources 57 to parent frame 28. At step 332, parent frame 28 displays destination web page and its associated protected resources 57.

Figure 4:
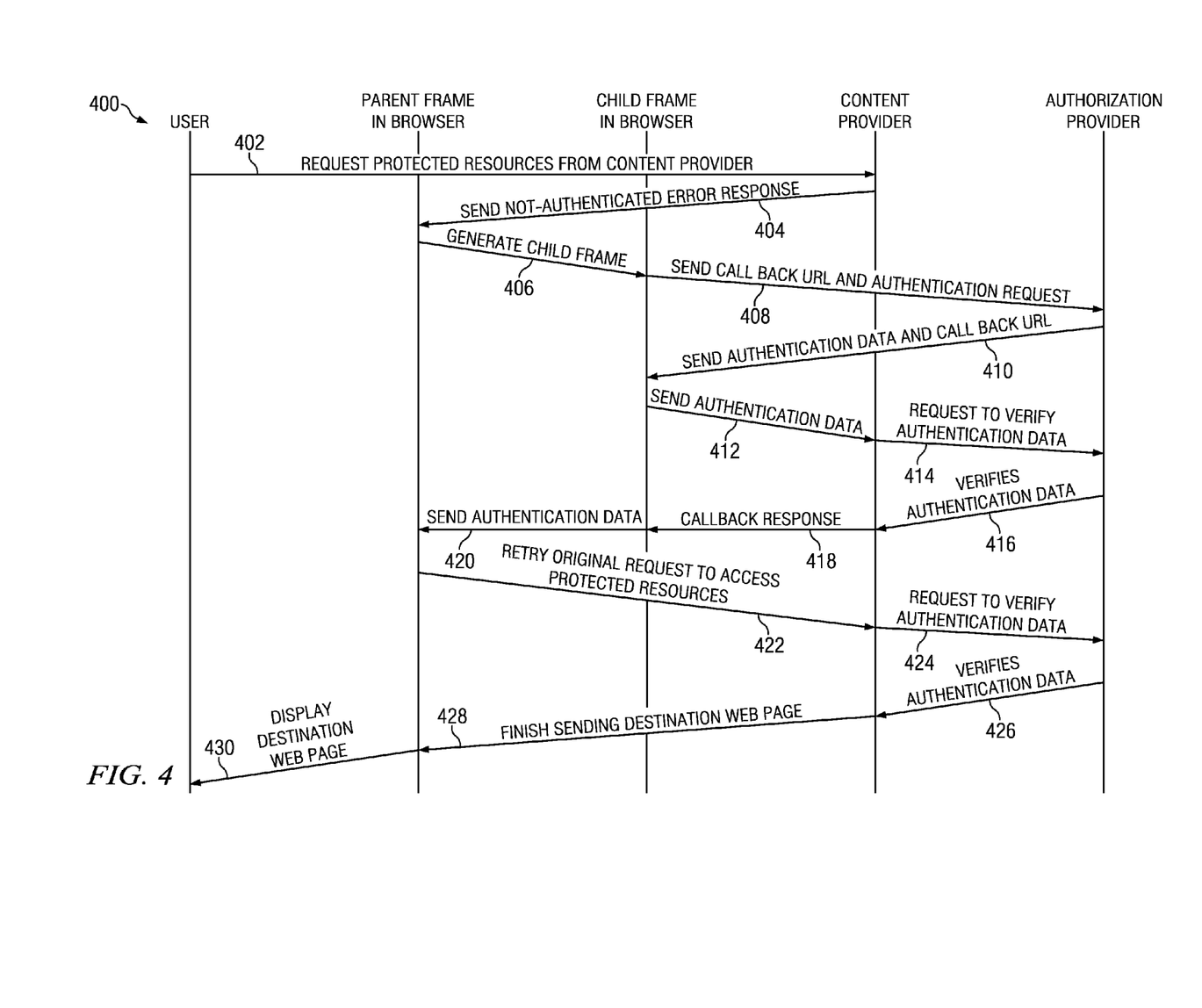
FIG. 4 illustrates a flow diagram of an embodiment for performing an authentication handshake, according to certain embodiments.

FIG. 4 illustrates a flow diagram 400 of an embodiment for performing an authentication handshake, according to certain embodiments. In the illustrated example, flow diagram 400 begins at step 402 when user 32 requests protected resources 57 from content provider 40. At step 404, content provider 40 may send a not-authenticated error response to parent frame 28.

At step 406, parent frame 28 generates child frame 30 to perform the authentication handshake. At step 408, child frame 30 sends the call back URL associated with landing web page 58 and authentication request to authorization provider 40 via an HTTP GET request of authentication web page 46. At step 410, authorization provider 40 sends authentication data 48 and the call back URL associated with landing web page 58 via a network response.

At step 412, child frame 30 sends authentication data 48 to content provider 50 via an HTTP GET request of landing web page 58. At step 414, content provider 50 requests authorization provider 40 to verify authentication data 48. At step 416, authorization provider 40 verifies authentication data 48 and sends this verification to content provider 50.

At step 418, content provider sends the authentication data 48 to child frame 30 via a callback network response. At step 420, child frame 30 sends authentication data 48 to parent frame 28. At step 422, parent frame 28 retries its original HTTP GET request, which now includes authentication data 48, to content provider to access protected resources 57. At step 414, content provider 50 requests authorization provider 40 to verify authentication data 48. At step 416, authorization provider 40 verifies authentication data 48 and sends this verification to content provider 50.

At step 428, content provider 50 finishes sending destination web page 56 and its associated protected resources 57 to parent frame 28. At step 430, parent frame 28 displays destination web page 56 and its associated protected resources 57.

The steps illustrated in FIGS. 3 and 4 may be combined, modified, or deleted where appropriate, and additional steps may also be added to those shown. Additionally, the steps may be performed in any suitable order without departing from the scope of the present disclosure.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method of authenticating a web user, the method comprising:
   receiving a request, at a content provider, for a destination web page from a parent frame of a web browser associated with the web user, wherein the content provider comprises one or more computing devices;
   sending the destination web page, from the content provider, to the parent frame of the web browser, wherein the destination web page when processed by the web browser is operable to perform operations comprising:
      determining if the web user is authenticated with the content provider;
      generating a child frame associated with the parent frame if the web user is not authenticated with the content provider;
      requesting, by the child frame, an authentication web page from an authorization provider;
      receiving, by the child frame, authentication data from the authorization provider, wherein the authentication data is associated with the web user; and
      receiving, by the parent frame, the authentication data; and
   receiving the authentication data at the content provider.

2. A method according to claim 1, further comprising:
   receiving the authentication data from the child frame of the web browser;
   determining if the authentication data grants the web user access to one or more protected resources associated with the destination web page; and
   sending the one or more protected resources to the parent frame of the web browser.

3. A method according to claim 2, wherein the one or more protected resources comprise at least one selected from the group consisting of:
   one or more photos;
   one or more documents;
   one or more contact lists; and
   one or more Uniform Resource Identifiers ("URIs").

4. A method according to claim 1, wherein the destination web page when processed by the web browser is operable to perform further operations comprising continuing to process data associated with the destination web page in the parent frame while the child frame is concurrently retrieving the authentication data from the authorization provider.

5. A method according to claim 1, wherein the destination web page comprises code.

6. A method according to claim 5, wherein the code comprises JavaScript.

7. A method according to claim 1, wherein the child frame is an iframe.

8. A method according to claim 1, wherein the child frame is hidden to the web user.

9. A method according to claim 8, wherein the destination web page comprises code to make the child frame appear invisible to the web user.

10. A method according to claim 8, wherein the destination web page comprises code to place the child frame off any visible section of the web browser.

11. A method according to claim 1, wherein the authentication data was generated by the authorization provider using a username and password entered by the web user.

12. A method according to claim 1, wherein the authentication data is stored in an authentication token, wherein the authentication token represents an encrypted string comprising a username and password associated with the web user.

13. A method according to claim 1, wherein the destination web page when processed by the web browser is operable to perform operations further comprising:
   determining if the authentication data is stored at the authorization provider;
   displaying the child frame to the web user if the web user is not authenticated with the content provider, wherein the visible child frame comprises an input field for a username of the web user and an input field for a password of the web user; and
   sending the username and the password to the authorization provider, wherein the authorization provider is operable to generate the authentication data using the username and the password.

14. A method according to claim 1, wherein the destination web page when processed by the web browser is operable to perform operations further comprising storing a cookie, wherein the cookie comprises the authentication data.

15. A method according to claim 1, wherein the destination web page when processed by the web browser is operable to perform operations further comprising sending, by the parent frame, a cookie to the content provider, wherein the cookie comprises the authentication data.

16. Logic for authenticating a web user, the logic being embodied in a non-transitory computer-readable medium and when executed operable to:
   process data associated with a content provider in a parent frame of a web browser associated with a web user;
   determine if the web user is authenticated with the content provider;
   generate a child frame associated with the parent frame if the web user is not authenticated with the content provider;
   request, by the child frame, an authentication web page from an authorization provider;
   receive, by the child frame, authentication data from the authorization provider, wherein the authentication data is associated with the web user; and
   receive, by the parent frame, the authentication data.

17. The logic according to claim 16, wherein the logic is further operable to:
   receive one or more protected resources, wherein the one or more protected resources are sent by the content provider if the web user is authenticated; and
   display one or more protected resources in the parent frame.

18. The logic according to claim 17, wherein the one or more protected resources comprise at least one selected from the group consisting of:
   one or more photos;
   one or more documents;
   one or more contact lists; and
   one or more Uniform Resource Identifiers ("URIs").

19. The logic according to claim 16, wherein the logic is further operable to continue to process the data associated with the destination web page in the parent frame while the child frame is concurrently requesting the authentication data from the authorization provider.

20. The logic according to claim 16, wherein the destination web page comprises code.

21. The logic according to claim 20, wherein the code comprises JavaScript.

22. The logic according to claim 16, wherein the child frame is an iframe.

23. The logic according to claim 16, wherein the child frame is hidden to the web user.

24. The logic according to claim 23, wherein the logic is further operable to make the child frame appear invisible to the web user.

25. The logic according to claim 23, wherein the logic is further operable to place the child frame off any visible section of the web browser.

26. The logic according to claim 16, wherein the authentication data was generated by the authorization provider using a username and password entered by the web user.

27. The logic according to claim 16, wherein the authentication data is stored in an authentication token, wherein the authentication token represents an encrypted string comprising a username and password associated with the web user.

28. The logic according to claim 16, wherein the logic is further operable to:
   determine if the authentication data is stored at the authorization provider;
   display the child frame to the web user if the web user is not authenticated with the content provider, wherein the visible child frame comprises an input field for a username of the web user and an input field for a password of the web user; and
   send the username and the password to the authorization provider, wherein the authorization provider is operable to generate the authentication data using the username and the password.

29. The logic according to claim 16, wherein the logic is further operable to store a cookie, wherein the cookie comprises the authentication data.

30. The logic according to claim 16, wherein the logic is further operable to send, by the parent frame, a cookie to the content provider, wherein the cookie comprises the authentication data.

31. A system for authenticating a web user, the system comprising:
   a content provider comprising one or more computing devices, wherein the content provider is operable to:
      receive a request for a destination web page from a parent frame of a web browser associated with the web user;
      send the destination web page to the parent frame of the web browser, wherein the destination web page when processed by the web browser is operable to perform operations comprising:
         determining if the web user is authenticated with the content provider;
         generating a child frame associated with the parent frame if the web user is not authenticated with the content provider;
         requesting, by the child frame, an authentication web page from an authorization provider;
         receiving, by the child frame, authentication data from the authorization provider, wherein the authentication data is associated with the web user; and
         receiving, by the parent frame, the authentication data; and
      receive the authentication data.

32. A system according to claim 31, wherein the content provider is further operable to:
   receive the authentication data from the child frame of the web browser;
   determine if the authentication data grants the web user access to one or more protected resources associated with the destination web page; and
   send the one or more protected resources to the parent frame of the web browser.

33. A system according to claim 32, wherein the one or more protected resources comprise at least one selected from the group consisting of:
   one or more photos;
   one or more documents;
   one or more contact lists; and
   one or more Uniform Resource Identifiers ("URIs").

34. A system according to claim 31, wherein the destination web page when processed by the web browser is operable to perform further operations comprising continuing to process data associated with the destination web page in the parent frame while the child frame is concurrently requesting the authentication data from the authorization provider.

35. A system according to claim 31, wherein the destination web page comprises code.

36. A system according to claim 35, wherein the code comprises JavaScript.

37. A system according to claim 31, wherein the child frame is an iframe.

38. A system according to claim 31, wherein the child frame is hidden to the web user.

39. A system according to claim 38, wherein the destination web page comprises code to make the child frame appear invisible to the web user.

40. A system according to claim 38, wherein the destination web page comprises code to place the child frame off any visible section of the web browser.

41. A system according to claim 31, wherein the authentication data was generated by the authorization provider using a username and password entered by the web user.

42. A system according to claim 31, wherein the authentication data is stored in an authentication token, wherein the authentication token represents an encrypted string comprising a username and password associated with the web user.

43. A system according to claim 31, wherein the destination web page when processed by the web browser is operable to perform operations further comprising:

determining if the authentication data is stored at the authorization provider;

displaying the child frame to the web user if the web user is not authenticated with the content provider, wherein the visible child frame comprises an input field for a username of the web user and an input field for a password of the web user; and     sending the username and the password to the authorization provider, wherein the authorization provider is operable to generate the authentication data using the username and the password.

44. A system according to claim 31, wherein the destination web page when processed by the web browser is operable to perform operations further comprising storing a cookie, wherein the cookie comprises the authentication data.

45. A system according to claim 31, wherein the destination web page when processed by the web browser is operable to perform operations further comprising sending, by the parent frame, a cookie to the content provider, wherein the cookie comprises the authentication data.

* * * * *